United States Patent [19]

Pontoppidan

[11] Patent Number: 4,653,736
[45] Date of Patent: Mar. 31, 1987

[54] SPRING SYSTEM HAVING A VARIABLE SPRING CHARACTERISTIC

[75] Inventor: Eskild Pontoppidan, Lyngby, Denmark

[73] Assignee: Flemming Hvidt Mobelarkitektfirma A/S, Denmark

[21] Appl. No.: 706,925

[22] PCT Filed: Jun. 1, 1984

[86] PCT No.: PCT/DK84/00050
§ 371 Date: Jan. 28, 1985
§ 102(e) Date: Jan. 28, 1985

[87] PCT Pub. No.: WO84/04790
PCT Pub. Date: Dec. 6, 1984

[30] Foreign Application Priority Data
Jun. 1, 1983 [DK] Denmark .................. 2485-83

[51] Int. Cl.[4] .................. F16F 1/12; F16F 3/04
[52] U.S. Cl. .................. 267/70; 267/61 S; 267/73; 267/168; 267/177
[58] Field of Search .................. 267/61 S, 69, 70, 71, 267/72, 168, 169, 175, 177, 73, 74, 173, 178, 60, 179; 114/205, 213, 215

[56] References Cited

U.S. PATENT DOCUMENTS

| | | | |
|---|---|---|---|
| 483,762 | 10/1882 | Crippen | 267/70 |
| 973,641 | 10/1910 | Dysart | 267/177 |
| 1,260,921 | 3/1918 | Leissner | 267/69 |
| 2,222,146 | 11/1940 | Jonsson | 267/73 X |
| 2,643,109 | 6/1953 | Wood | 267/69 X |
| 2,969,972 | 1/1961 | Holmen | 267/173 |
| 3,399,879 | 9/1968 | Hojo et al. | 267/178 |

FOREIGN PATENT DOCUMENTS

| | | |
|---|---|---|
| 57543 | 8/1982 | European Pat. Off. |
| 2302392 | 8/1973 | Fed. Rep. of Germany |
| 1215172 | 11/1959 | France |

*Primary Examiner*—Douglas C. Butler
*Assistant Examiner*—Richard R. Diefendorf
*Attorney, Agent, or Firm*—Bacon & Thomas

[57] ABSTRACT

A spring system for providing an elastic force between two machine parts, including concentric compression and tension springs disposed in parallel within a housing, with one pair of corresponding ends of the springs being connected by a movable coupling piece, and the other pair of corresponding ends being connected to a stationary stop and a connecting element, whereby a movable stop permits variation of the effective point of connection between the compression spring and machine part connected therewith.

2 Claims, 11 Drawing Figures

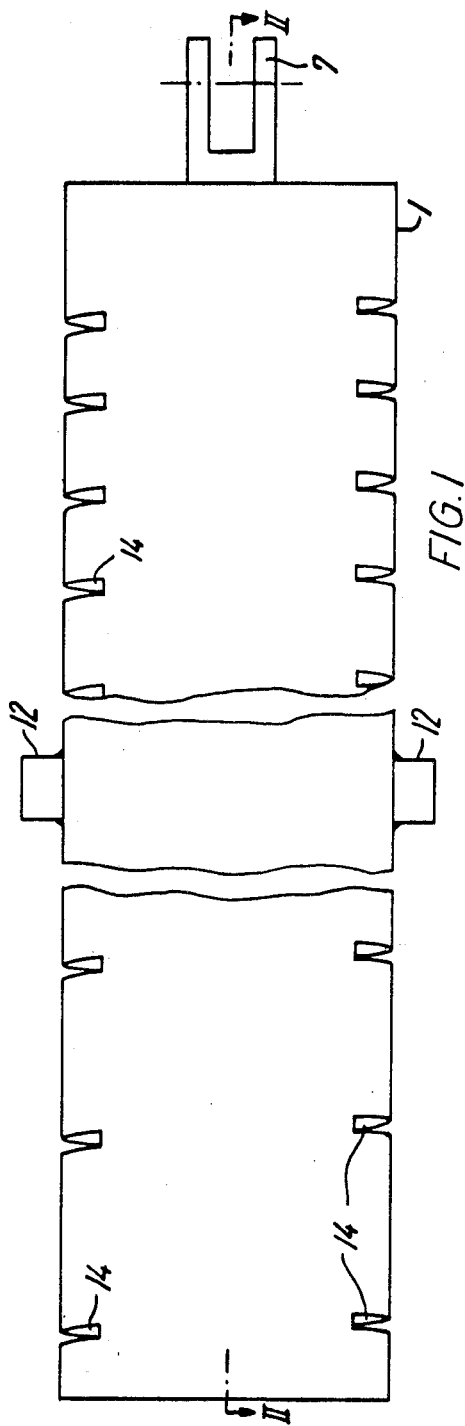
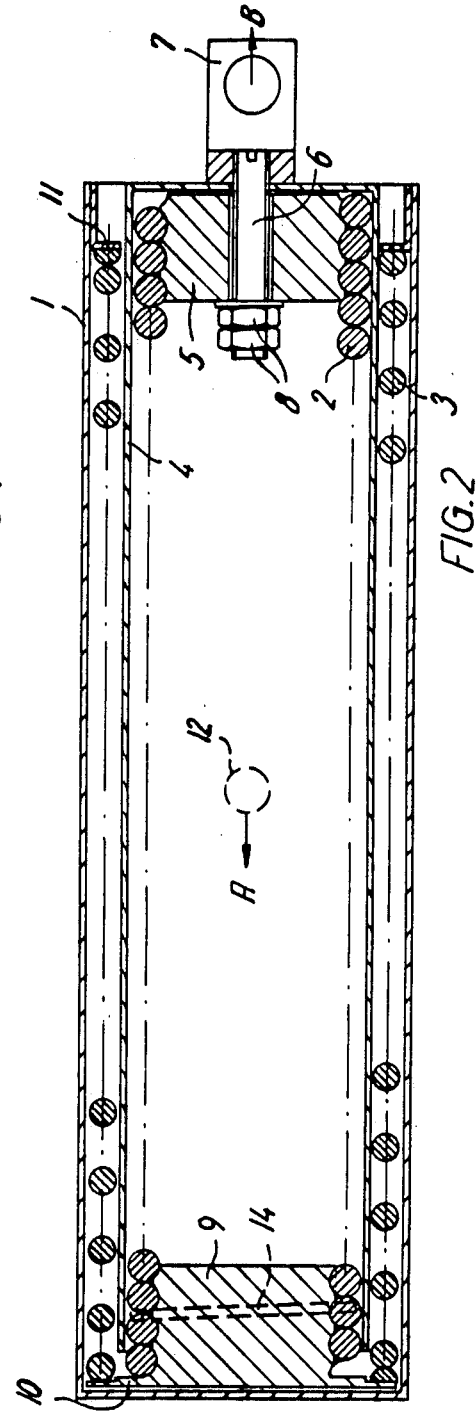

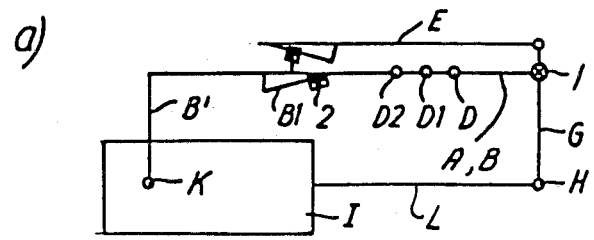
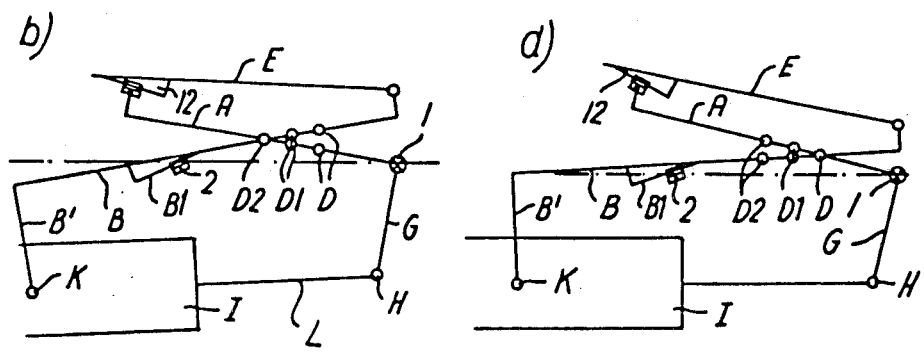
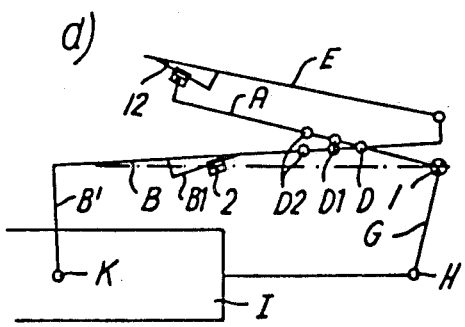
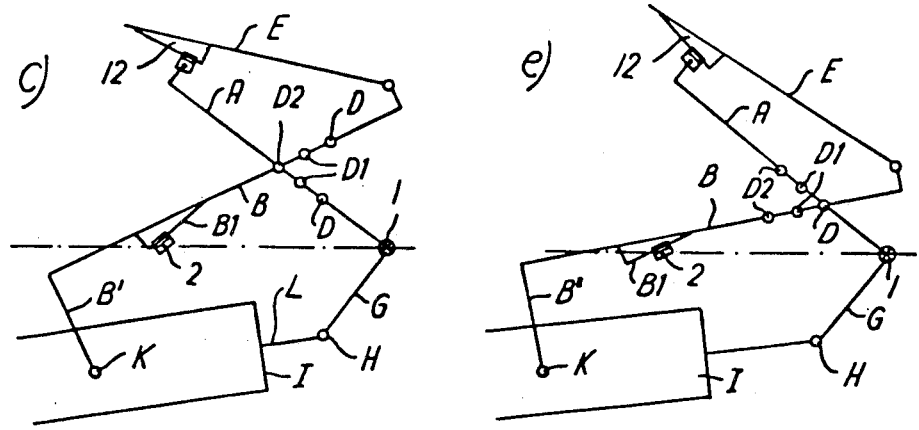
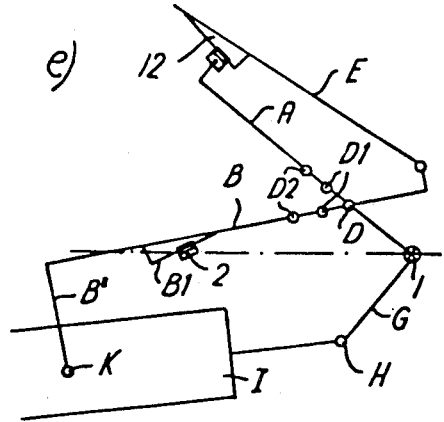
FIG.5

SPRING SYSTEM HAVING A VARIABLE SPRING CHARACTERISTIC

The invention relates to a spring system comprising at least two mainly parallel, e.g. concentric, springs, wherein at least one spring, having a variable spring characteristic, is connected at its one end with one of two parts, between which an elastic force is to be introduced, and at least one other spring is connected at its one end with the other part.

It is known that the spring characteristic of a spring, i.e. the travel of the spring as a function of the elastic force, can be changed by altering the number of the effective turns of the spring, e.g. by means of a clamp which fixes a number of the spring's turns in relation to each other. The elastic force corresponding to a given travel of the spring can thereby be varied, e.g. in a mechanism in which a spring acting as a power spring actuates two parts to move a certain distance towards or away from each other at different loads, i.e. by exerting various spring forces, or in a spring suspension system in which various loads are absorbed, the travels of the spring being unchanged.

If, for example, the same spring is in this way to be made to exert different elastic forces within a predetermined interval, e.g. 50–100 kp, with a constant, likewise predetermined, spring travel, a fairly long and bulky spring must be used, which both permits the deformation corresponding to the desired spring travel at the small force, e.g. 50 kp, and by reduction of the number of effective turns limits the deformation to the same value at the large force, e.g. 100 kp. At the elastic force interval of 50–100 kp chosen as example the slope of the spring characteristic must thus be changed by a factor of 2, and the free spring length, i.e. the total length of the spring without load will be somewhat more than twice the desired spring travel. This means that a solution such as this is often not feasible owing to considerations of space.

From the U.S. Pat. No. 973,641 a spring system is known with two concentric springs, between which a tubular member is provided the ends of which are in mesh between the turns on the innermost and outermost spring, respectively. By turning the tubular member one can increase or diminish the elastic force of the two springs at the same time, but unless other manipulations are made, this also increases or diminishes the resulting elastic force of the system in the initial position, which is often disadvantageous.

A purpose of the present invention is to produce a spring system which in connection with a simple and compact structure and without replacement of the spring permits a particularly large variation in the spring characteristic, i.e. a considerable increase or decrease of the elastic force within a predetermined interval at a predetermined spring travel and with unchanged elastic force in the initial position.

This is obtained by a spring system of the kind referred to above according to the invention by the other opposite ends of the springs being in firmly connection with each other and having a constant distance from each other in the direction of the spring.

As a result of the mutual position and interconnection of the springs it is obtained that the resulting spring travel for the spring system equals the sum of the travels of at least two springs, and as at least one of these has a variable characteristic, a very considerable range of variation for the slope of the system's spring characteristic can be obtained depending on the choice of spring. The total obtainable spring travel that can be made to approach or even exceed the length of the spring system in the initial position also depends on the choice of spring. Moreover, a constant elastic force is obtained in the initial position, if the distance between the parts actuated by the spring system is always the same in the initial position.

In principle, in a spring system according to the invention, an arbitrary number of springs can be used, but in many cases it is sufficient to have two springs, which can be two tension springs, two compression springs or one tension and one compression spring, and of which one has a variable characteristic and preferably in the unloaded initial position is weaker than the other spring, e.g. according to the invention two concentric springs, at least one of which has a variable characteristic, said springs being connected with their respective spring-actuated parts and with each other, the junction between one of the springs and either the appurtenant spring-actuated part or the other spring being variable with a view to varying the number of effective turns of the spring in question.

A spring system according to the invention having, e.g. two springs with identical characteristics, will in the initial position with an unregulated characteristic for the variable spring have a resultant system characteristic with a slope corresponding to twice the slope of the characteristic of the individual springs, because a force acting on one of the springs is transferred to the other spring via the connection between the springs, and the springs are deformed to an equal extent. However, if the number of effective turns of the variable spring is diminished, the slope of the characteristic of this spring and thereby also the slope of the characteristic of the system decreases. If, for example, the number of effective turns in the variable spring is reduced to zero, the slope of the spring characteristic of the system decreases to half of the starting value. This possibility of variation is obtained at a comparatively small length of the spring system in comparison to the resultant spring travel, because this is equal to the sum of the travels of the individual springs.

A greater variation in the slope of the characteristic of the system can however be obtained, if springs with different characteristics are used in the system, that is, for example, two springs, one of which, preferably the spring with a variable number of effective turns, is weaker and has a steeper characteristic curve than the other spring. The strong spring can, if desired, have a certain initial tension.

When a spring system such as this is acted on by a gradually increasing load, the weak spring will be deformed most, and if the strong spring has an initial tension, to begin with only the weak spring is deformed, and its characteristic will then be practically the sole determining factor of the spring characteristic for the spring system as a whole. In that case the system characteristic will have a breaking-point at the load corresponding to the initial tension, at which load the strong spring begins to be deformed and thereby contribute to the total spring travel, which of course is again equal to the sum of the travels of the individual springs, in this case the two individual springs.

Again a variable system characteristic with a comparatively large spring travel in relation to the length of the spring system has been obtained, and by the use of a strong spring with a preload the breaking-point in the characteristic produced by this can be moved by alteration of the number of effective turns in the weak spring.

In both cases the load corresponding to a given total spring travel or total deformation of the individual springs depends on the proportion in which the deformation is divided between the springs, and this proportion can be adjusted by variation of the number of effective turns of the—at least in the initial position—weaker spring. If this number is large, a given total travel corresponds to a comparatively small load, and if the number of effective turns in the weak spring is low or perhaps zero, the given total travel corresponds to a greater load, because the strong spring then performs a greater part of or even the whole of the total travel of the system.

This applies if, for example, the spring system is constituted by two tension springs or two compression springs and—particularly as regards the tension spring—is loaded only within the range in which Hooke's law applies. This can be secured, for instance, by restricting the travel of a tension spring by means of a stop.

In a suitable embodiment of the invention the spring system is constituted by tension springs and compression springs, e.g. two springs, the weak spring being a compression spring and the strong spring being a tension spring.

In the case of a gradually increasing load of the spring system in this embodiment it is also first and foremost the weak spring, i.e. the compression spring, that is deformed, and the system characteristic corresponds in essentials to the characteristic of this spring with an initial slope corresponding to its slope, particularly if the stronger tension spring has an initial tension. After a certain deformation of the compression spring, deformation of the stronger tension spring begins to appear, and the two springs jointly determine the system characteristic, which also in this case may have a breaking-point and has now a steeper course. When the load is further increased the compression spring may at some point become completely compressed, and no longer contribute to the deformation or travel of the spring system. The system characteristic gets a new breaking-point and is then less steep, the slope being determined by the strong spring and thus being less than the initial slope. The system characteristic and thereby the load corresponding to a given travel may also here be adjusted by variation of the number of effective turns of the weak spring. If this number is low, the strong spring will comparatively quickly come to determine the course of the system characteristic, and a given travel will correspond to a comparatively great load on the spring system.

In all cases a variation of the characteristic of the spring system is permitted in connection with the spring system as a whole having a comparatively short length in relation to the spring travel, because the travels of the separate springs comprised in the system and situated vis a vis each other, e.g. concentric springs, are added together. The range of variation can be made greatest when the spring system is constituted by a combination of tension and compression springs, because the latter can be subjected to a more considerable load than tension springs and in the present context do not lose their effect because they are completely compressed. This means, for instance, that a compression spring with a variable number of effective turns can be combined with a considerably stronger tension spring having a very flat spring characteristic. The resultant system characteristic will then take a very progressive course. Yet, it should be mentioned that in this context a compression spring may be equated to a tension spring having a deformation-restricting stop, e.g. a drawing cable in the spring connecting the first and last turn of the spring and having a length corresponding to the maximal spring length.

A spring system according to the invention can be realized with very simple means, and can suitably be constructed with ordinary coil springs.

By the terms "weaker" and "stronger" spring is here meant the spring whose characteristic at a given free spring length, i.e. length in unloaded condition, has respectively the greatest and the least slope.

The invention is explained below on the basis of a few examples of embodiments with reference to the drawings, wherein:

FIG. 1 shows a practical embodiment of a spring system in a housing,

FIG. 2 is a sectional view along the line II—II in FIG. 1,

FIGS. 5a–5e depict an example of use of a system according to the invention.

Figure 3:
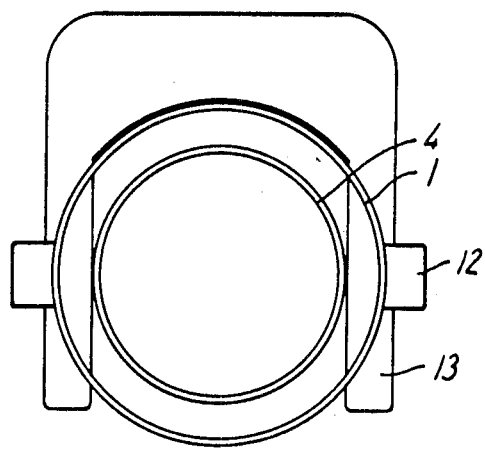
FIG. 3 depicts an adjusting clamp for the spring system shown in FIGS. 1 and 2.

FIG. 2 shows two concentric coil springs in the form of a tension spring 2 and a compression spring 3 in a joint housing 1. Of these two springs the tension spring 2 has by way of example the greatest elastic force, and it may have an initial tension.

The spring 2 is accommodated in a tube 4, at the bottom of which it is attached by one of its ends, e.g. by means of a plug 5 screwed into the spring, through which plug extends a bolt 6, which also extends through the bottom of the tube and outside this bears, for instance, a drawing eyelet 7 that is screwed on. Inside the bolt 6 is fixed to the plug 5 by means of a couple of nuts 8.

At the opposite end of the spring 2 a plug 9 is also screwed in, and this plug has a radial flange 10, via which the spring 2 is connected at the said end with one end of the spring 3, which extends in the ring-shaped space between the tube 4 and the housing 1 and at its opposite end abuts against a ring 11 serving as a stop, the said ring being attached to the inner wall of the housing.

The two parts which are to be connected with each other via the spring system are connected, respectively, with the housing 1, e.g. by means of a couple of pins 12 attached externally to this housing, and with the drawing eyelet 7, whereby the two parts, which are not shown but merely indicated by A and B, are connected to one end of either one of the springs 2 and 3, namely, the right end in FIG. 2, these springs being connected to each other at their other ends via the plug 9.

When the spring system shown in FIG. 2, which is a tension spring system, is subjected to a load, e.g. by the drawing eyelet 7 being subjected to tension towards the right in FIG. 2, the spring 3, which as stated is in this case the weaker of the two springs, is deformed first and mostly, and under compression of the spring 3 the tube 4 is moved a corresponding distance out of the housing 1. When the load has reached a certain size, e.g. when the turns of the spring 3 fit tightly against each other or shortly before depending on whether or not there is an initial tension in the spring 2, the deformation of the stronger spring 2 begins, and the extraction of the tube 4 from the housing 1 continues, the plug 9, which with its flange 10 abuts against and is held by the compressed spring 3, keeping the end of the spring 2, into which it is screwed.

During the first part of the extraction of the part 7 the spring characteristic for the spring system as a whole has a course corresponding to the characteristic for the spring 3, as will directly be seen, whereas the characteristic of the system during the last part of extraction movement, where the spring 3 can be wholly compressed, has a course determined by the characteristic of the spring 2 and thereby less steep, if the spring travel is plotted along the axis of ordinates and the spring force along the axis of the abscissa. The resulting spring travel for the spring system is equal to the sum of the travels of the two separate springs, whereas the length of the housing 1 does not appreciably exceed the length of each of the two springs.

It can be seen from FIG. 1 that the spring system's housing 1 has slits 14 along two opposite sides. These slits lie in pairs opposite each other, a connecting line between two slits in a pair forming an angle corresponding to the pitch of the turns of the spring 3 with the longitudinal axis of the housing 1. In each such pair of slits a U-shaped clamp or fork, for example, can be inserted, as shown in FIG. 3, where it is designated as 13. The internal distance between the legs of the clamp is slightly greater than the diameter of the tube 4, such that the clamp 13 can be inserted over this tube.

With this clamp 13 one can vary the spring characteristic for the spring 3 and thereby for the spring system as a whole, as one can thereby vary the effective length of the spring 3. The insertion of the clamp 13 corresponds to moving the stop at 11 towards the left. The closer to the linking point 9, 10 between the two springs 2 and 3, i.e. the further to the left in FIGS. 1 and 2 the clamp 13 is placed, the shorter becomes the effective length of the spring 3, and the earlier the spring 2 comes to determine the characteristic of the system. Thus, the slope of this characteristic can be reduced by insertion of the clamp 13 further to the left in FIGS. 1 and 2 and the slope can be increased by the clamp being moved to the right, until the maximum steepness is obtained when the clamp 13 is removed completely.

As stated, the spring system in FIG. 2 is made up of a tension spring 2 and a compression spring 3. If the flange 10 on the plug 9 is removed, the left end of the spring 3 in FIG. 2 is attached to the end wall of the housing 1, and the left end turn of the spring 2 is firmly connected to the right end of the spring 3, and the stop ring 11 is removed, the spring 3 can also be a tension spring, and the effective part of the spring will lie to the right of the clamp 13, but the shown combination of a tension and a compression spring is simpler both from the point of view of construction and installation. An example of a system with tension springs alone is indicated schematically in FIG. 4b.

A spring system according to the invention will, for example, in many cases be able to be used as a prime mover for the raising and lowering mechanism in a piece of furniture of the kind having a seat that can swing up and down, in particular for handicapped persons. An example of such mechanism, which is described in the Danish patent specification No. 146,223, is shown schematically in FIGS. 5a-5c. Other raising and lowering mechanisms for the stated purpose are, for example, described in U.S. Pat. Nos. 3,479,086 and 4,185,335.

In the example of a seat lift shown in FIGS. 5a-5e, in which a spring system according to the invention can be used as prime mover, the seat itself is designated as E.

From the one end position shown in FIG. 5a, where the seat E is horizontal, the seat is moved via the position shown in FIG. 5b to the other end position shown in FIG. 5c, where the seat inclines downwards so that the user can more easily leave it. The movement is obtained by means of a prime mover I, e.g. an electric motor with a worm drive, which when raising the seat E exerts tension on a spindle L, which via a hinge point H is connected to an arm G, which thereby turns a bearing arm A around the point 1. The bearing arm A is both connected to the rear edge of the seat E and in a point D,D1, D2 connected to another bearing arm B, which at one end is connected to the front edge of the seat E and at its opposite end at K is connected to the housing of the prime mover I. Under the influence of the prime mover I the points K and H are thus made to approach each other when raising the seat E, whereas they move away from one another when lowering the seat.

If instead of, e.g. an electric motor as the prime mover I a spring system is used according to the invention, e.g. in the form shown in FIG. 2, this spring system in the initial position of the seat E as shown in FIG. 5a, in which the power requirement is large, will exercise a very great tension between the points K and H, when the user releases a lock which arrests the seat in the lowered horizontal position, and a somewhat weaker tension when the seat approaches the other end position shown in FIG. 5c. The tension exerted by the spring system between the points K and H can be adjusted and adapted according to the weight of various users by means of the U-shaped clamp.

With the spring system as prime mover the chair is not dependent on the existence of a source of energy, e.g. a battery or an electric socket.

However, there are also other uses for a spring system according to the invention, and the use in a seat lift described above is only an example. Thus, in many cases it will also be possible to use a spring system according to the invention instead of a variable counterweight, e.g. in connection with cranes.

Also in apparatus or constructions in which a constant elastic force is desired between two parts at a variable movement or mutual distance a spring system elaborated according to the present invention will be able to be used.

Figures 4A, 4B, 4C:
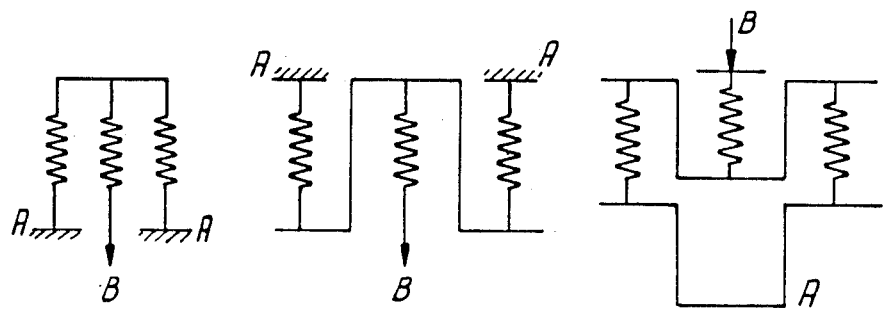
FIGS. 4a–4c depict various realizations of a spring system according to the invention with different combinations of compression and tension springs.

FIGS. 4a-4c shows schematically three examples of spring systems according to the invention. All three examples involve a system with three parallel springs, placed vis a vis each other, and in each of these systems either the middle spring or the two exterior springs may have a variable spring characteristic. Moreover, it holds good for each of the three systems that the two exterior springs can be replaced by a single spring, which then preferably surrounds and is concentric with the middle spring.

FIG. 4a shows a system with two exterior compression springs and a tension spring between them. This system is both from the point of view of construction and function analogous to the embodiment shown in FIG. 2.

FIG. 4b shows a system with three tension springs analogous to the one suggested in connection with the explanation of FIG. 2.

FIGS. 4a and 4b show tension spring systems, and FIG. 4c shows a compression spring system involving three compression springs.

I claim:

1. A spring system for imparting an elastic force between two parts comprising:
   (a) a housing;
   (b) at least first and second springs disposed within the housing;
   (c) means carried by the housing for connecting the first spring to one part;
   (d) a coupling piece movable within the housing and connecting one pair of corresponding ends of the first and second springs;
   (e) a stationary stop and a connecting element disposed within the housing, the stationary stop connecting the other end of the first spring and the connecting element connecting the other end of the second spring;
   (f) the connecting element being provided with means for connecting the element to the other part; and
   (g) a movable stop for varying the effective point of connection between the first spring and part connected therewith.

2. The spring system of claim 1 wherein the housing includes two opposed longitudinal wall sections and a plurality of openings provided in each wall section, wherein each opening in one wall section corresponds to an opening in the opposed wall section, and the movable stop being selectively insertable in any corresponding pair of openings for engaging the first spring.

* * * * *